United States Patent
Christian et al.

(10) Patent No.: US 6,593,439 B1
(45) Date of Patent: Jul. 15, 2003

(54) ADDITION POLYMERIZATION IN A HOMOGENEOUS REACTION MIXTURE

(75) Inventors: Paul Christian, Bulwell (GB); Steven Melvyn Howdle, Toton (GB); Derek John Irvine, Stockton on Tees (GB)

(73) Assignee: Imperial Chemical Industries Plc, London (GB)

( * ) Notice: Subject to any disclaimer, the term of this patent is extended or adjusted under 35 U.S.C. 154(b) by 0 days.

(21) Appl. No.: 09/719,987

(22) PCT Filed: Jun. 9, 1999

(86) PCT No.: PCT/GB99/01830

§ 371 (c)(1),
(2), (4) Date: Mar. 6, 2001

(87) PCT Pub. No.: WO99/67297

PCT Pub. Date: Dec. 29, 1999

(30) Foreign Application Priority Data

Jun. 24, 1998 (GB) .............................................. 9813573

(51) Int. Cl.⁷ ................................................. C08F 18/20
(52) U.S. Cl. ........................ 526/246; 526/245; 526/319; 526/329.7; 525/276; 525/288
(58) Field of Search ................................. 524/505, 245, 524/377, 401, 502; 525/88, 92, 93, 276, 288; 526/329.7, 279, 288, 276, 319

(56) References Cited

U.S. PATENT DOCUMENTS

| | | | | |
|---|---|---|---|---|
| 5,312,882 A | * | 5/1994 | DeSimone et al. | 526/194 |
| 5,382,623 A | * | 1/1995 | DeSimone et al. | 524/401 |
| 5,506,317 A | * | 4/1996 | DeSimone et al. | 425/522 |
| 5,589,105 A | * | 12/1996 | DeSimone et al. | 252/364 |
| 5,639,836 A | * | 6/1997 | DeSimone et al. | 526/194 |
| 5,679,737 A | * | 10/1997 | DeSimone et al. | 252/364 |
| 5,733,964 A | * | 3/1998 | Johnston et al. | 524/245 |
| 5,780,553 A | * | 7/1998 | DeSimone et al. | 525/276 |

FOREIGN PATENT DOCUMENTS

| EP | 0814112 | | 12/1997 |
|---|---|---|---|
| WO | WO 95/04085 | * | 2/1995 |

* cited by examiner

*Primary Examiner*—Tatyana Zalukaeva
(74) *Attorney, Agent, or Firm*—Pillsbury Winthrop LLP

(57) ABSTRACT

A method of producing a polymer comprises the steps of forming a heterogeneous reaction mixture comprising at least one addition polymerizable monomer, a supercritical fluid, and a stabilizer, wherein the stabilizer comprises a chain which is soluble in the supercritical fluid and functional end-group which is not polymerizable by a free-radical mechanism, and polymerizing said at least one monomer in the reaction mixture. In a preferred system for polymerizing acrylic monomers, the fluid comprises supercritical carbon dioxide and the stabilizer comprises an acid-functionalized perfluoropolyether.

5 Claims, No Drawings

ADDITION POLYMERIZATION IN A HOMOGENEOUS REACTION MIXTURE

This application is the national phase of international application PCT/GB99/01830 filed Jun. 9, 1999 which designated the U.S, and that international application was published under PCT Article 21(2) in English.

The present invention relates to addition polymers, in particular to methods of manufacturing such polymers by dispersion polymerisation techniques.

Acrylic polymers, such as polymethyl methacrylate are well known and widely used commercially important examples of addition polymers. They may be prepared by various methods, including by bulk polymerisation, emulsion polymerisation or polymerisation in solution. Dispersion polymerisation has the advantage of keeping the viscosity of the polymerisation mixture low and enabling the morphology of the polymer to be controlled and so is particularly suitable for producing high molecular weight polymer beads.

Polymerisation in supercritical fluids, especially supercritical carbon dioxide ($sCO_2$) has been demonstrated to have the advantages of allowing good control of particle size whilst also producing polymer with a low residual monomer concentration. In addition, the $CO_2$ does not contaminate the resulting polymer. EP-A0735051 describes the free-radical polymerisation of styrene which includes heating a monomer, initiator and a free-radical agent in supercritical $CO_2$.

WO-A-9504085 describes the use of high molecular weight fluorinated graft copolymers and block copolymers for use as surfactants in emulsion polymerisations using supercritical $CO_2$ as the continuous phase. The emulsion polymerisation of acrylamide in a $sCO_2$ continuous phase with an amide-functionalised fluoropolymer used as an emulsifier is described by Beckman et al in *Macromolecules* 1994 p 312.

In dispersion polymerisation the monomer is dissolved in the reaction medium and the resulting polymer, which is not soluble in the reaction medium, must be kept dispersed to enable the polymerisation reaction to be carried out efficiently and to control the resulting polymer particle morphology. A stabiliser may be added to the reaction mixture to keep the polymer produced in the reaction in dispersion. The requirement of a stabiliser compound for this purpose is that it is soluble in the reaction medium, e.g. the supercritical fluid and has an affinity for the polymer. Existing technology uses high molecular weight block or graft copolymers which can effectively wrap and coat the growing polymer particle, thus maintaining a stable dispersion and facilitating control of the reaction.

Dispersion polymerisation in $s-CO_2$ using block copolymers is described in *ACS Polymer Preprints* 1997, p400; *Macromolecules* 1995 28 p.8159 (DeSimone et al). The use of graft copolymers as dispersion polymerisation stabilisers is described in *Macromolecules* 1997 30 p. 745 (Beckman et al) in which the stabiliser described has perfluoropolyether chains grafted onto an acrylic backbone. DeSimone describes the use of a methyl methacrylate-terminated polydimethyl siloxane polymer as a stabiliser for the dispersion polymerisation of methyl methacrylate (*Macromolecules* 1996 29 p.2704). This stabiliser has a polymerisable end-group and thus remains bound into the structure of the resulting polymer.

The stabiliser materials described in the prior art are usually required to be used at high concentration (typically 1–2% or more w/w based on monomer) and, since they are relatively complex molecules to prepare, they are relatively expensive materials to use. Another problem associated with the use of these stabilisers is that they tend to remain in the finished polymer and can be difficult to remove completely. Also they may not be completely recoverable from the reaction, which further adds to the expense of using them.

It is therefore an object of the present invention to provide a method of producing an acrylic polymer by dispersion polymerisation in supercritical fluids which overcomes some of the above-mentioned problems.

According to the invention a method of producing a polymer comprises the steps of forming a homogeneous reaction mixture comprising at least one addition polymerisable monomer, a fluid reaction medium, and a stabiliser, wherein the stabiliser comprises a chain which is soluble in the fluid and a functional end-group which is not polymerisable by a free-radical mechanism and polymerising said at least one monomer in the reaction mixture.

According to a second aspect of the invention, a stabiliser for use in dispersion polymerisation of acrylic monomers in a fluid reaction medium comprises a material having a chain which is soluble in the fluid reaction medium and a functional end-group which is not polymerisable by a free-radical mechanism.

The monomer may be any suitable unsaturated compound which is useful in the formation of addition polymers. Suitable monomers include, but are not limited to, optionally functionalised or substituted vinyl monomers such as styrene, acrylic monomers, vinyl chloride, vinyl acetate substituted olefins and maleic anhydride. A preferred group of monomers comprises esters of acrylic or methacrylic acids, their alkyl esters, and substituted analogues thereof. More than one monomer may be present if a copolymer product is required. Preferred monomers include alkyl acrylates, methacrylates and ethacrylates, especially methyl (meth)acrylate, ethyl (meth)acrylate and butyl (meth) acrylate.

The reaction is preferably carried out in the presence of a free-radical initiator. Suitable initiators include azo-compounds such as azobis(isobutyronitrile) (AIBN), azobis (4-methoxy-2,4-dimethylvaleronitrile (commercially available as "V-70"), and peroxides such as dicumyl peroxide and t-butyl peroxide.

The fluid reaction medium may comprise any known fluid in which the monomer is soluble and preferably comprises a fluid which may be brought into supercritical state as commonly known in the art. As is known in the art such fluids may be subjected to conditions of temperature and pressure up to a critical point at which the equilibrium line between liquid and vapour regions disappears. Supercritical fluids are characterised by properties which are both gas-like and liquid-like. In particular the fluid density and solubility properties resemble those of liquids, whilst the viscosity, surface tension and fluid diffusion rate in any medium resemble those of a gas, giving gas-like penetration of the medium.

Preferred fluids include carbon dioxide, di-nitrogen oxide, carbon disulphide, aliphatic C2–10 hydrocarbons such as ethane, propane, butane, pentane, hexane, ethylene, and halogenated derivatives thereof such as for example carbon hydrogen trifluoride or chloride and HCF134a, C6–10 aromatics such as benzene, toluene and xylene, C1–3 alcohols such as methanol and ethanol, sulphur halides such as sulphur hexafluoride, ammonia, xenon, krypton and the like. Typically these fluids may be brought into supercritical conditions at temperature of between 0–150° C. and pressures of 7–1000 bar, preferably 12–800 bar. It will be appreciated that the choice of fluid may be made according to its properties, for example diffusion and solvent properties. The choice of fluid may also be made with regard to critical conditions which facilitate the commercial preparation of the polymer.

The preferred fluid comprises supercritical carbon dioxide, optionally in admixture with a further fluid. The advantages of using carbon dioxide include the fact that it forms a supercritical fluid at relatively low temperatures (32° C. at 74 bar), is readily available and easy to handle and can be removed from the reaction mixture by venting, leaving little residue.

The temperatures and pressures used depend upon the nature of the fluid used and the conditions under which it exhibits supercritical properties. The reaction need not be carried out under supercritical conditions and the fluid may be a liquid when the temperature is below the supercritical range of the fluid. Also the temperature and pressure at which the reaction is carried out is dependent upon the nature of the initiator used, as is known in the art. In a preferred system, for the polymerisation of acrylic materials in supercritical carbon dioxide, the reaction is preferably carried out at pressures in the range 1,000–10,000 psi, more preferably 1,500–7,000 psi at temperatures of between about 0–150° C., preferably between about 40–80° C., e.g. about 70° C. when the initiator used is AIBN.

The stabiliser comprises a chain which is soluble in the fluid and a functional end-group. The fluid-soluble chain may comprise fluoropolymers, siloxanes, polyphosphazenes, polyethylene oxides or other polymer chains which are soluble in the chosen supercritical fluid. Preferably the stabiliser comprises a functionalised fluoropolymer, especially a functionalised perfluoropolyether, which is preferably terminally functional. Suitable end-groups comprise a carboxylic acid, amide ester, amine, acid chloride, alcohol, phosphate or like group. Preferably the stabiliser comprises a carboxylic acid end-group. A particularly preferred stabiliser comprises a carboxylic acid terminated perfluoro polyether. The stabiliser may be monofunctional or polyfunctional, e.g. difunctional, however monofunctional stabilisers are preferred. The molecular weight of the stabiliser may vary widely, e.g. between about 300 and $10^6$ Daltons (D). We have found that materials having a molecular weight ($M_w$) in the range 1000–10,000 are particularly effective as stabilisers in some preferred systems. We have found that suitable such stabilisers include carboxylic acid terminated perfluoro polyether materials such as those sold under the trade names KRYTOX™ 157 FSL, 157 FSM, 157 FSH by DuPont, GALDEN™ MF300 or FOMBLIN™ DA601 as sold by Ausimont. We have found that the use of such materials as a stabiliser allows good control of the morphology of the polymer particles produced and effectively stabilises the polymerisation. A further advantage offered by the use of these materials is that the stabiliser appears not to become incorporated into the polymer and may be removed from the polymer relatively easily by venting along with the fluid solvent.

The concentration of stabiliser in the reaction mixture is preferably in the range $1 \times 10^{-5}$–40 wt % with respect to the monomer concentration, more preferably 0.01–10%. We have found that the concentration of the stabiliser affects the morphology of the polymer particles produced in the reaction. By varying the stabiliser concentration, the resulting polymer may have a morphology which vanes from isolated spherical particles of mean diameter 0.5–5 $\mu$m to elongated chains of agglomerated particles which form open porous structures of high surface area. At low stabiliser concentrations, nodular morphologies may be formed. At a stabiliser concentration of 0.1–35% when the fluid used is supercritical $CO_2$, the polymerisation of methyl methacrylate produces well dispersed particles and the stabiliser may be removed easily by venting. The morphology produced may also be controlled by controlling the density of the supercritical fluid.

The molecular weight of the polymer produced may vary widely e.g. from 20,000–400,000 Daltons ($M_w$). We have found that a particular advantage of the method of the invention using the stabilisers described above is that the yield of polymer produced may be relatively high. For example, typical yields achievable are at least 85% when the polymer molecular weight is in the range 130,000–300,000.

The polymerisation mixture may include other additives, such as chain transfer agents for example. Chain transfer agents are commonly used to produce polymer which is more thermally stable than normal radical-terminated polymer. Suitable chain transfer materials are well known and include a range of mercaptans. A further advantage of the polymerisation method of the invention is that residual chain transfer agent may be easily removed from the polymer by venting with the fluid medium.

The method of the invention is further described in the following Examples.

EXAMPLE 1

A high-pressure autoclave (60 ml volume) was charged with about 10 g of methyl methacrylate (MMA), 1 wt % (by weight of MMA) of azobis(isobutyronitrile), and 1 wt % of KRYTOX™ FSL, which is a carboxylic acid-terminated perfluoro polyether sold by DuPont. The autoclave was then pressurised with $CO_2$ to 200 bar and the temperature rapidly increased to 70° C. to initiate the polymerisation reaction. After 4 hours, the $CO_2$ was vented and a fine white polymer powder had been formed at a yield of >95% (based on monomer). The molecular weight of the resulting polymer was determined by gel permeation chromatography (GPC) and the morphology and particle size (when particles were formed) were determined by scanning electron microscopy (SEM). The polymer particles had a relatively uniform particle size of 2.5 $\mu$m and a polydispersity index (PDI) of <2.8.

EXAMPLE 2

The procedure described in Example 1 was followed using a number of different acid-functionalised perfluoro polyethers as stabilisers at a concentration of 1%. The stabilisers differed in molecular weight (measured in Daltons). The results are shown in Table 1.

TABLE 1

| Stabiliser | Stabiliser mol wt. (D) | % yield | $M_n$ (kD) | PDI | particle diameter average ($\mu$m) |
|---|---|---|---|---|---|
| Galden MF300 | 850 | 96.10 | 47.40 | 3.10 | — |
| Krytox 157 FSL | 2500 | 96.10 | 54.40 | 2.68 | 2.70 |
| Krytox 157 FSM | 5000 | 99.90 | 54.20 | 2.85 | 1.90 |
| Krytox 157 FSH | 7000 | 97.20 | 51.50 | 2.61 | 1.90 |

The results show that a high yield of polymer of high molecular weight and good polydispersivity was obtained using all of the stabilisers. However the low molecular weight stabiliser did not produce a particulate polymer.

EXAMPLE 3

The polymerisation procedure described in Example 1 was repeated using Fluorolink E™ which is a perfluoropolyether having an Mn of about 2000 D and terminated at each end with an alcohol group. The resulting polymer had an Mn of approx. 40 kD, and a PDI of about 3. The morphology of the polymer was not particulate.

EXAMPLE 4

The polymerisation procedure described in Example 1 was repeated using Fluorolink C™ which is a perfluoropolyether having an Mn of about 2000 D and terminated at each end with an acid group. The resulting polymer had an Mn of approx. 35 kD, and a PDI of about 3.5. The morphology of the polymer was not particulate.

EXAMPLE 5

The polymerisation procedure described in Example 1 was repeated using Fomblin™ DA601 which is a perfluoropolyether having an Mn of about 5000 D and terminated at one end with a phosphate group. The resulting polymer had an Mn of approx. 50 kD, and a PDI of about 2.7. The polymer was particulate, with average particle size of about 2.7 $\mu$m.

EXAMPLE 6 (COMPARATIVE)

The polymerisation procedure described in Example 1 was repeated using Galden™ HT55 which is an unfunctionalised perfluoropolyether having an Mn of about 2000 D. This compound was immiscible with the MMA monomer. The resulting polymer was produced in a yield of about 24% w/w, had an Mn of approx. 17.7 kD, and a PDI of about 3.3. The polymer was of such low molecular weight it was extracted as a solution in the monomer and so morphology was not studied.

EXAMPLE 7

The procedure of Example 1 was repeated using Krytox™ 157 FSL at varying concentrations. The results are shown in Table 2 below.

TABLE 2

| Stabiliser conc (% w/w) | % yield | $M_n$ (kD) | PDI | average particle diameter ($\mu$m) |
| --- | --- | --- | --- | --- |
| 0 (Comparative) | 28.6 | 10.90 | 3.6 | agglomerated |
| 0.0001 | 89.2 | 32.3 | 4.0 | " |
| 0.0002 | 90.1 | 42.7 | 3.40 | " |
| 0.0008 | 94.5 | 50.1 | 2.80 | chains of particles |
| 0.01 | 96.2 | 54.9 | 2.64 | 2.1 |
| 0.1 | 93.2 | 40.0 | 2.79 | 2.9 |
| 1.0 | 95.9 | 47.7 | 2.62 | 2.9 |
| 2.77 | 92.5 | 52.2 | 2.95 | 2.5 |
| 4.18 | 91.8 | 65.9 | 2.43 | 2.5 |
| 10.4 | 99.9 | 68.1 | 2.45 | 2.6 |
| 16.0 | 91.9 | 62.7 | 2.62 | 2.6 |
| 32.0 | 85.3 | 89.9 | 1.93 | 2.0 |

The results show that the use of Krytox 157 FSL as a stabiliser greatly increases the yield of the polymer even at very low concentrations and that the resulting polymer is in the form of discrete particles at concentrations as low as 0.01%. At very low concentrations, or in the absence of stabiliser, a foam-like morphology is seen on a microscopic scale. Increasing the concentration of the stabiliser tends to increase the molecular weight of the polymer.

EXAMPLE 8

The polymerisation procedure in Example 1 was repeated using Krytox 157 FSL as stabiliser and butyl mercaptan as a chain transfer agent the results are shown in Table 3.

TABLE 3

| % w/w butyl mercaptan | % yield | Mw (kD) | $M_n$ (kD) | PDI |
| --- | --- | --- | --- | --- |
| 0.01 | 96.8 | 119.5 | 42.1 | 2.84 |
| 0.04 | 93.6 | 119.2 | 48.8 | 2.40 |
| 0.06 | 86.9 | 107.4 | 36.3 | 2.96 |
| 0.08 | 80.7 | 75.5 | 27.2 | 2.78 |
| 0.20 | 75.5 | 47 | 21.3 | 2.20 |
| 0.26 | 66.7 | 36.6 | 16.7 | 2.19 |

The results show that polymerisation in the presence of chain transfer agents is possible using the method of the invention and that the molecular weight of the polymer produced falls with increasing concentration of the mercaptan, as would be expected. Also, the experiment demonstrates that the efficiency of the chain transfer agent appears to be increased compared to dispersion polymerisation in conventional fluid media with alternative stabilisers. The chain transfer constant of a methyl methacrylate/butyl mercaptan system is given in The Polymer Handbook (Brandrup & Immergut, John Wiley pub) 3rd Edn, page ii/135 as 0.66. The chain transfer constant was estimated from the experimental results in Table 3 from the slope of a plot of [butyl mercaptan]/[MMA] versus $1/X_n$, where $X_n = M_n/$(molecular weight of MMA) as 8.0. Therefore the method of the present invention may allow less chain transfer agent to be used than in conventional methods. Since mercaptans may have an unpleasant odour, it is beneficial to use a reduced quantity.

EXAMPLE 9

A series of polymerisations were conducted using the general procedure outlined in Example 1, but at varying pressures. The results are shown in Table 4, below. The results show that the molecular weight and particle size may be controlled by controlling the pressure of the reaction and therefore the density of the supercritical $CO_2$.

TABLE 4

| Pressure (psi) | density $CO_2$ (g/cm³) | % yield | Mw (kD) | $M_n$ (kD) | PDI | average particle diameter ($\mu$m) |
| --- | --- | --- | --- | --- | --- | --- |
| 1500 | 0.257 | 99.30 | 257.1 | 74.0 | 3.47 | 3.5 |
| 2100 | 0.455 | 99.9 | 189.2 | 66.8 | 2.83 | 3.5 |
| 2800 | 0.626 | 96.0 | 150.6 | 47.0 | 3.15 | 2.5 |
| 3514 | 0.713 | 92.6 | 132.8 | 40.3 | 3.30 | 2.8 |
| 4000 | 0.753 | 99.9 | 139.9 | 47.2 | 2.96 | 2.8 |
| 4436 | 0.786 | 91.6 | 107.4 | 43.9 | 2.78 | 2.4 |
| 4900 | 0.807 | 80.5 | 102 | 46.8 | 2.20 | foam-like |

What is claimed is:

1. A method of producing a polymer comprising the steps of forming a homogeneous reaction mixture comprising at least one addition polymerisable monomer, a fluid reaction medium, and a stabiliser, wherein the stabiliser comprises a perfluoro polyether chain which is soluble in the fluid reaction medium and a carboxylic acid functional end-group which is not polymerisable by a free-radical mechanism, and polymerising said at least one monomer in the reaction mixture.

2. A method as claimed in claim 1, wherein said stabiliser is present at a concentration in the range $1 \times 10^{-5}$–40 wt %.

3. A method as claimed in claim 1, wherein said fluid reaction medium comprises supercritical carbon dioxide.

4. A method as claimed in claim 1, wherein said at least one monomer is selected from the group comprising esters of acrylic or methacrylic acids, their alkyl esters, and substituted analogues thereof.

5. A method as claimed in claim 1, wherein the reaction mixture further comprises a chain transfer agent.

* * * * *